United States Patent
Mitchell et al.

(10) Patent No.: US 7,437,081 B2
(45) Date of Patent: Oct. 14, 2008

(54) SYSTEM AND METHOD FOR PROVIDING TWO-WAY COMMUNICATION OF QUANTUM SIGNALS, TIMING SIGNALS, AND PUBLIC DATA

(75) Inventors: J. Howell Mitchell, Amherst, NH (US); Harry N. Vig, Billerica, MA (US); Anton Zavriyev, Swampscott, MA (US); Alexei Trifonov, Boston, MA (US)

(73) Assignee: Magiq Technologies, Inc, New York, NY (US)

( * ) Notice: Subject to any disclaimer, the term of this patent is extended or adjusted under 35 U.S.C. 154(b) by 567 days.

(21) Appl. No.: 10/978,973

(22) Filed: Nov. 1, 2004

(65) Prior Publication Data

US 2006/0093376 A1 May 4, 2006

(51) Int. Cl.
*H04B 10/00* (2006.01)
*H04K 1/00* (2006.01)
(52) U.S. Cl. ............... 398/154; 398/151; 380/256
(58) Field of Classification Search ........... 398/151, 398/152, 154; 380/256
See application file for complete search history.

(56) References Cited

U.S. PATENT DOCUMENTS

| | | | | |
|---|---|---|---|---|
| 4,965,856 | A | 10/1990 | Swanic | 455/617 |
| 5,307,410 | A | 4/1994 | Bennett | 380/21 |
| 5,675,648 | A | 10/1997 | Townsend | 380/21 |
| 6,438,234 | B1 | 8/2002 | Gisin et al. | 380/256 |
| 2003/0007484 | A1* | 1/2003 | Beshai | 370/370 |
| 2003/0231771 | A1 | 12/2003 | Gisin et al. | |
| 2004/0190719 | A1 | 9/2004 | Lo | |
| 2005/0152540 | A1* | 7/2005 | Barbosa | 380/28 |
| 2005/0163149 | A1* | 7/2005 | Unitt et al. | 370/442 |

FOREIGN PATENT DOCUMENTS

WO   WO 2004073235   *   8/2004

OTHER PUBLICATIONS

Muller, et al., *"Plug and Play" Systems For Quantum Cryptography*, 1997, pp. 793-795, American Institute of Physics.
Stucki, et al., *Quantum Key Distribution Over 67 km With a Plug & Play System*, Jul. 2002, pp. 41.1-41.8, New Journal of Physics.

(Continued)

*Primary Examiner*—Shi K Li
*Assistant Examiner*—Nathan M Curs
(74) *Attorney, Agent, or Firm*—Opticus IP Law PLLC; Peter A. Nieves; Joseph E. Gortych

(57) ABSTRACT

A system and method for providing two-way communication of quantum signals, timing signals, and public data is provided. Generally, the system contains a first public data transceiver capable of transmitting and receiving public data in accordance with a predefined timing sequence, a first optical modulator/demodulator capable of transmitting and receiving timing signals in accordance with the predefined timing sequence, a first quantum transceiver capable of transmitting and receiving quantum signals in accordance with the predefined timing sequence, and a first controller connected to the first public data transceiver, the first optical modulator/demodulator, and the first quantum transceiver. The first controller is capable of controlling the transmission of the public data, the timing signals, and the quantum signals in accordance with the predefined timing sequence.

13 Claims, 6 Drawing Sheets

OTHER PUBLICATIONS

Bennett, Charles H., *Quantum Cryptography Using Any Two Nonorthogonal States*, Dec. 1991, pp. 3121-3124, Physical Review Letters, vol. 68, No. 21.

Ribordy, et al., *Automated 'Plug & Play' Quantum Key Distribution*, Oct. 1998, pp. 2116-2117, Electronics Letters, vol. 34, No. 22.

Ekert, et al., *The Physics of Quantum Information*, 2000, Chapter 2., *Quantum Cryptography*, pp. 13-33.

Goodman, et al., "Quantum Cryptography for Optical Networks . . . ", Lasers and Electro-Optics Society, LEOS 2003; The 16th Annual Meeting of the IEEE; vol. 2, 2003, pp. 1040-1041.

\* cited by examiner

SYSTEM AND METHOD FOR PROVIDING TWO-WAY COMMUNICATION OF QUANTUM SIGNALS, TIMING SIGNALS, AND PUBLIC DATA

CROSS REFERENCE TO RELATED APPLICATIONS

The present application is related to and claims priority from the co-pending patent application entitled, "QKD Systems with Robust Timing," having a filing date of Feb. 7, 2004, and having serial number PCT/US2004/003394, which is incorporated herein in its entirety.

FIELD OF THE INVENTION

The present invention is generally related to data transmission, and more particularly is related to cryptography.

BACKGROUND OF THE INVENTION

With advancements in technology, means of transmitting data has changed from use of a physical medium, such as mail, to the use of telecommunications. Unfortunately, the use of telecommunications for the transmission of data has introduced concerns as to security of the transmitted data.

Encryption is an example of technology utilized to provide a more secure method of transmitting data from a first point to a second point. In addition, the secure transmission provided by encryption is intended to prevent a third party from eavesdropping on the transmission. Unfortunately, classical encryption techniques are vulnerable to interception and decryption by third parties.

To alleviate this problem quantum encryption has been proposed. Quantum Key Distribution (QKD) is an advanced technology capable of fast, reliable, and unconditionally secure (in terms of computational power) quantum key distribution over a large distance. A QKD system typically provides an apparatus utilized for secure key exchange between two distant parties that are connected via a means of communication, such as an optical cable. Specifically, in QKD, a key is established between a sender ("Alice") and a receiver ("Bob") by using weak (e.g., 0.1 photon, on average) optical signals transmitted over a "quantum channel." The security of the key distribution is based on the quantum mechanical principal that any measurement of a quantum system in an unknown state will modify its state. As a consequence, an eavesdropper ("Eve") that attempts to intercept or otherwise measure the quantum signal will inherently introduce errors into the transmitted signals, thereby revealing her presence.

A typical QKD system contains a quantum layer, comprising a single photon counter, that is utilized to prepare and deliver the quantum signal from Alice to Bob, a data acquisition system (e.g., a computer with an input/output (I/O) card), a bi-directional classical data communication channel, and at both Alice and Bob, data processing logic utilized to distill the hidden key from raw data. Software protocols are also an important portion of the QKD system, and are utilized to run the QKD system and perform different actions, such as, authentication, sifting, error correction, and privacy amplification. The QKD system may also contain different types of classical encryption hardware and software that are known to those having ordinary skill in the art. The hidden key is typically produced by a random number generator (RNG), which may be provided as a portion of Alice.

The transmission of the Quantum key requires reduced power so as to allow for transmission of single photon pulses or signals. Alternatively, the transmission of data packets over a public discussion layer (e.g., Ethernet) requires large amounts of power. Large amounts of power, resulting in the transmission of thousands of photons at a time, may result in Raman and Rayleigh scattering, thereby negatively affecting the single photon pulses. Due to the different requirements of the Quantum Key distribution path and the public discussion layer, it is difficult, if not impossible, to transmit the Quantum Key and data over the public discussion layer, both on the same optical fiber. Instead, a single fiber is typically dedicated for the public discussion layer, while a second fiber is used for Quantum key distribution. Alternatively, the fiber distance is shortened so that input power may be reduced and so the scattering power transfer ratio is lower due to the shorter fiber distance.

Thus, a heretofore unaddressed need exists in the industry to address the aforementioned deficiencies and inadequacies.

SUMMARY OF THE INVENTION

Embodiments of the present invention provide a system and method for providing two-way communication of quantum signals, timing signals, and public data. Briefly described, in architecture, one embodiment of the system, among others, can be implemented as follows. The system contains a first public data transceiver capable of transmitting and receiving public data in accordance with a predefined timing sequence, a first optical modulator/demodulator capable of transmitting and receiving timing signals in accordance with the predefined timing sequence, a first quantum transceiver capable of transmitting and receiving quantum signals in accordance with the predefined timing sequence, and a first controller connected to the first public data transceiver, the first optical modulator/demodulator, and the first quantum transceiver. The first controller is capable of controlling the transmission of the public data, the timing signals, and the quantum signals in accordance with the predefined timing sequence.

The present invention can also be viewed as providing methods for providing two-way communication of quantum signals, timing signals, and public data. In this regard, one embodiment of such a method, among others, can be broadly summarized by the following steps: transmitting public data signals during a first predefined timing slot; stopping the transmission of the public data for a predefined period; and transmitting quantum signals and timing signals during a second predefined timing slot, wherein the first and second predefined timing slots define the predefined timing sequence.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides quantum key distribution systems and methods that enable quantum key distribution, the transmission of public discussion layer data (e.g., Ethernet), and the transmission of timing signals over a single optical fiber or other transmission medium, where the single optical fiber is relatively long in length. This is provided by reducing or removing power made available to allow public discussion layer data transmission whenever quantum signals and/or timing/synchronization signals (synchs) are to be transmitted and received.

As is known by those having ordinary skill in the art, synchs are strong optical pulses that are used to synchronize Alice and Bob. Synchs are described in more detail herein. It should be noted that the present detailed description describes use of Ethernet as the transmission protocol utilized for transmitting public discussion layer data (public data), otherwise referred to herein as classical public data signals. It should be noted, however, that use of Ethernet is merely provided herein for exemplary purposes and public discussion layer data transmission may be provided via use of different protocols.

Figure 1:
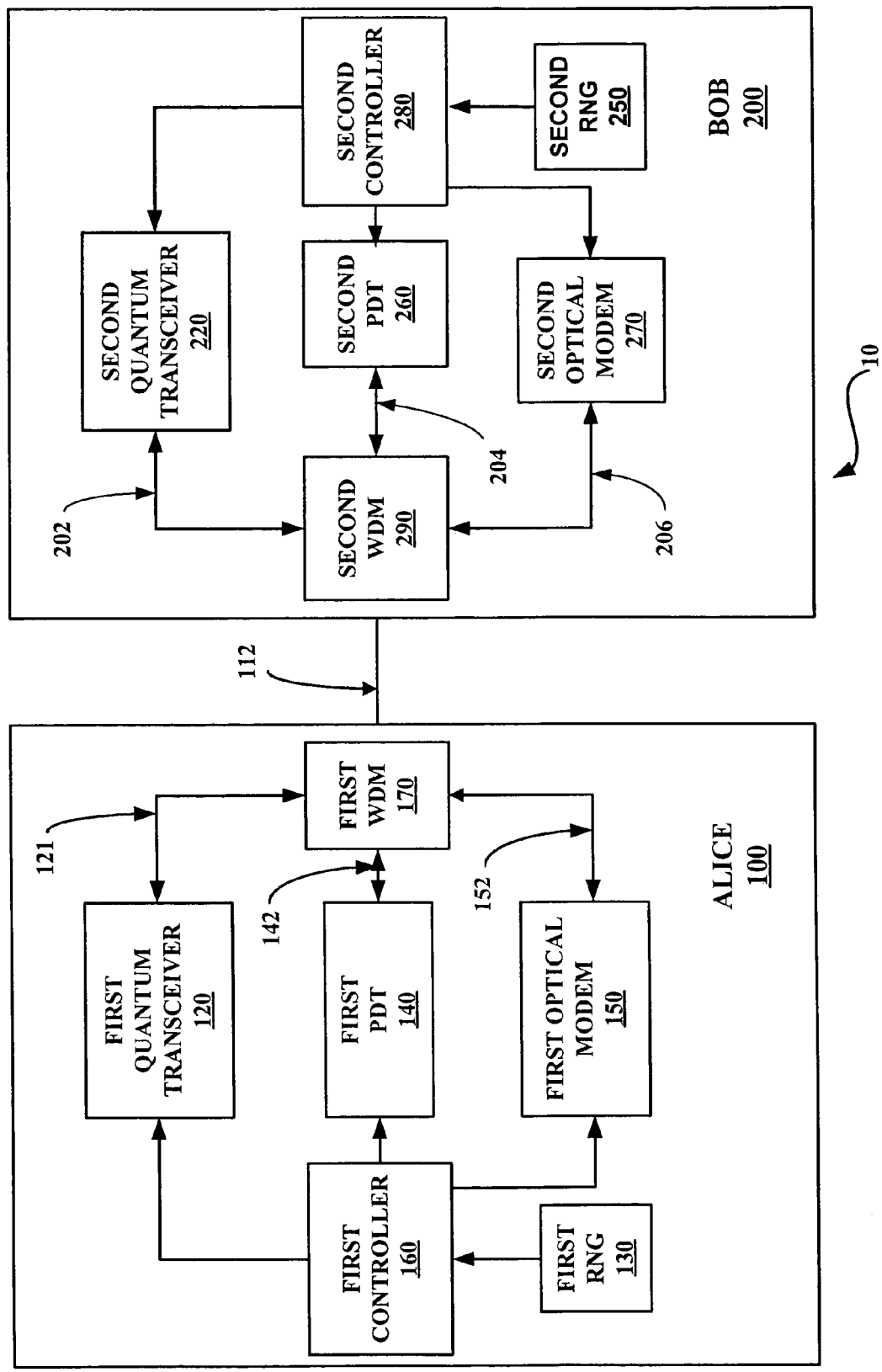
FIG. 1 is a block diagram providing a high-level illustration of a quantum key distribution (QKD) system, in accordance with a first exemplary embodiment of the invention.

FIG. 1 is a block diagram providing a high-level illustration of a quantum key distribution (QKD) system 10, in accordance with a first exemplary embodiment of the invention. As is shown by FIG. 1, the system 10 contains two QKD stations, namely, a first QKD station, Alice 100, and a second QKD station, Bob 200. Alice 100 contains a first quantum channel optics layer ("quantum transceiver") 120 for preparing, transmitting, and/or receiving quantum signals sent to or received from Bob 200 via a quantum channel 121. It should be noted that the term "quantum transceiver" is used herein to describe the optical layer used to prepare, transmit, receive, or both transmit and receive quantum signals over the quantum channel 121. In addition, "quantum signals" are signals that travel over the quantum channel between quantum transceivers.

Referring to FIG. 1, Alice 100 also contains a first random number generator (RNG) 130 that is coupled to a first controller 160. The first RNG 130 provides random numbers to the first controller 160, so as to allow the first controller 160 to control the first quantum transceiver 120 in randomly setting either the polarization or phase of a quantum signal based on a select set of polarizations or phases. Use of the first RNG 130 is described in detail herein.

Alice 100 also contains a first public data transceiver (PDT) 140 coupled to a classical public data channel 142. The first PDT 140 is adapted to acquire and process public data signals that are used to publicly transmit and receive data (e.g., encrypted messages) between Alice 100 and Bob 200. As noted above, examples of such signals are Ethernet signals. The first PDT 140 is coupled to the first controller 160.

Alice 100 contains a first optical modulator/demodulator (modem) 150 that is coupled to a timing channel 152. The first optical modem 150 is adapted to transmit and receive optical signals sent over the timing channel 152. The optical signals are necessary for carrying out timing operations and the optical signals (e.g., synchronization signals) are necessary for the QKD system 10 to function properly. Further description of optical signals is provided herein. The first modem 150 is also coupled to the first controller 160.

As mentioned above, Alice 100 also contains the first controller 160. The first controller 160 is coupled to the first quantum transceiver 120, the first PDT 140, and the first optical modem 150. The first controller 160 is adapted to coordinate the timing of operation of the above-mentioned coupled components, as well as the timing of transmission of quantum signals, synchronization signals, and public data, as is described in detail below. As is also mentioned above, the first controller 160 is also coupled to the first RNG 130.

The basic architecture of Bob 200 is similar to that of Alice 100. Specifically, Bob 200 contains a second quantum transceiver 220, a second RNG 250, a second PDT 260, a second optical modem 270, and a second controller 280, each of which is essentially arranged as in Alice 100 and has similar functionality, except as described herein. The second quantum transceiver 220, second PDT 260, and second optical modem 270 communicate with the first quantum transceiver 120, first PDT 140, and first optical modem 150, respectively, located in Alice 100, via the optical fiber 112. In addition, similar to Alice 100, Bob 200 also contains a quantum channel 202, a public data channel 204, and a timing channel 206.

As is illustrated by FIG. 1, the QKD system 10 also contains a first wavelength division multiplexer (WDM) 170, located at Alice 100, and a second WDM 290 located at Bob 200. As is known by those having ordinary skill in the art, a WDM is a device that combines separate wavelengths from individual fiber sources (waveguides) into a single optical fiber (optical waveguide) having multiple channels. Within the present system 10, the WDMs 170, 290 optically and/or electrically multiplex the data channel, quantum channel, and timing channel so as to allow transmission of the three channels over the single optical fiber 112, while the channels are modulated at different wavelengths.

As is described in detail herein, the QKD system 10, via the first controller 160 and the second controller 280, provides time multiplexing of the single optical fiber 112 between the quantum signals, synchronization signals (syncs), and public data so that the quantum signals and synchs may be allowed to be transmitted at the same time, while the public data is transmitted at a time different from the quantum signals and/or the syncs. The timing of signal and data transmission is described in more detail below.

Figure 2:
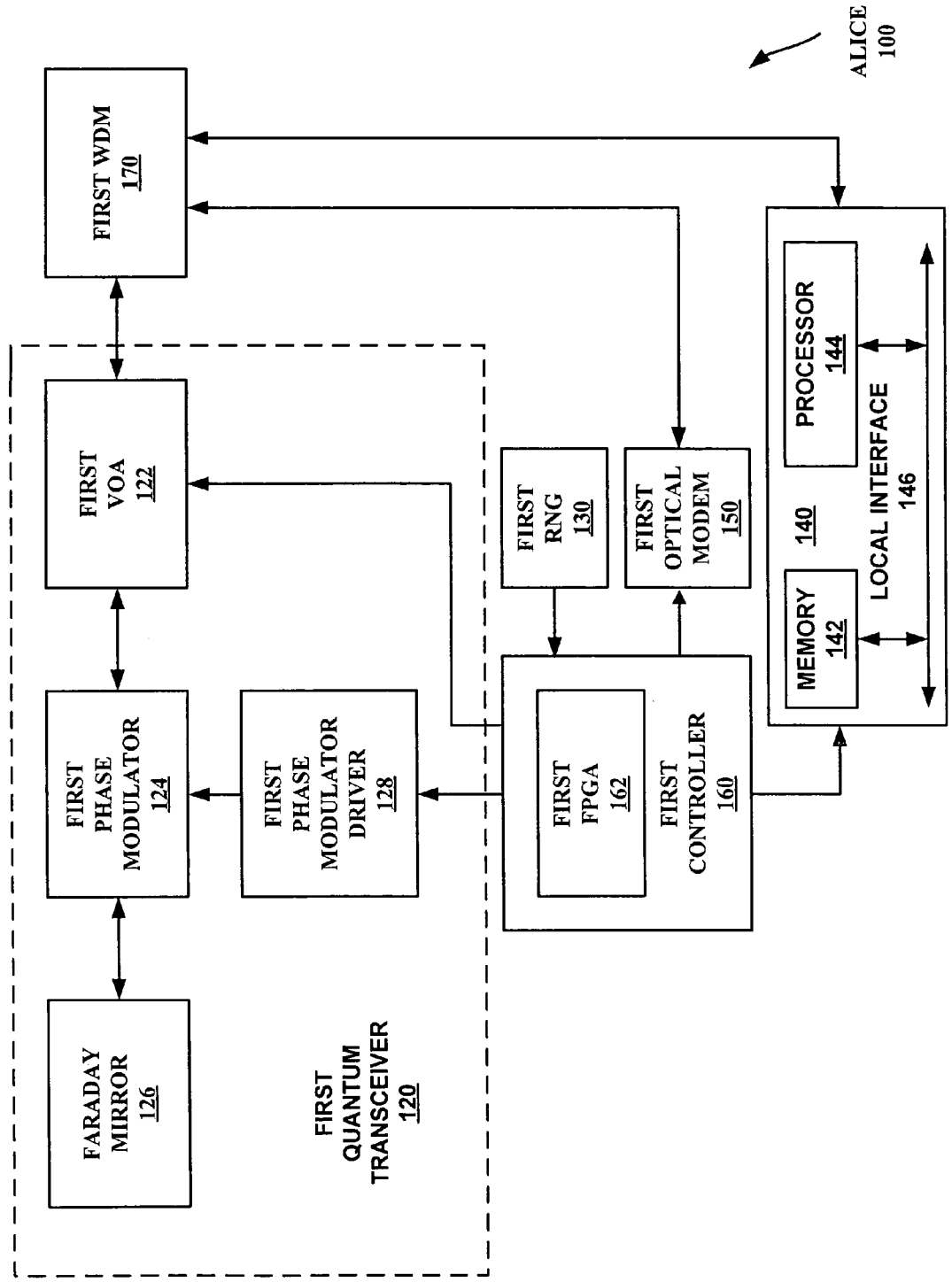
FIG. 2 is a block diagram further illustrating the first QKD station, Alice, of FIG. 1, in accordance with the first exemplary embodiment of the invention.

FIG. 2 is a block diagram further illustrating the first QKD station, Alice 100, in accordance with the first exemplary embodiment of the invention. As is shown by FIG. 2, Alice 100 contains the first quantum transceiver 120. It should be noted that both the first quantum transceiver 120 and the second quantum transceiver 220 are two way quantum transceivers. In addition, portions of the first and second quantum transceivers 120, 220, as described herein, are provided merely as examples. One having ordinary skill in the art would appreciate that other configurations of the first and second quantum transceivers 120, 220 may be utilized, thereby replacing or removing logic described herein. In fact, other configurations of Alice 100 and Bob 200 may be utilized as well. A detailed description of pulse creation and modification by logic within Alice 100 and Bob 200 follows the description of Bob 200 with regard to FIG. 3.

Referring to FIG. 2, the first quantum transceiver 120 contains a first variable optical attenuator (VOA) 122, where the VOA 122 is coupled to the first WDM 170. The first VOA 122 is capable of controlling intensity of a light pulse received by the first WDM 170. In addition, the first VOA 122 is capable of controlling intensity of a light pulse to be transmitted from the first VOA 122 to the first WDM 170.

The first VOA 122 is coupled to a first phase modulator 124. The first phase modulator 124 is capable of changing phase of a received light pulse. The first phase modulator 124 is in communication with a reflective device 126, such as, but not limited to, a Faraday mirror. It should be noted that the first phase modulator 124 may also be coupled to the Faraday mirror 126. Herein, the example of the Faraday mirror is provided, however, it should be noted that different reflective devices capable of reflecting quantum signals may be utilized instead. The Faraday mirror 126 is arranged optically downstream of the first phase modulator 124. The Faraday mirror 126 reflects received pulses and rotates the polarization of each pulse by ninety degrees (90°).

The first phase modulator 124 is also coupled to a first phase modulator driver 128. As is known by those having ordinary skill in the art, a phase modulator driver is capable of driving a phase modulator at specific instances. Actions responsible for causing a phase modulator driver to drive a phase modulator may differ. In accordance with the first exemplary embodiment of the invention, such driving is caused by a command, such as, but not limited to, a trigger pulse, received by the first phase modulator driver 128 from the first controller 160 (the first controller 160 is located outside of the first quantum transceiver 120), which is connected to the first phase modulator driver 128.

As is illustrated by FIG. 2, outside of the first quantum transceiver 120, Alice 100 also contains the first controller 160. The first controller 160 is coupled to the first phase modulator driver 128 and the first VOA 122, both of which are located within the first quantum transceiver 120. In addition, the first controller 160 has a first field programmable gate array (FPGA) 162 located therein for assisting in the coordination of communication between Alice 100 and Bob 200. The coordination of communication between Alice 100 and Bob 200 is described in detail herein.

The first RNG 130 is also located outside of the first quantum transceiver 120, as is the first PDT 140, the first optical modem 150, and the first WDM 170. The first RNG 130 is coupled to the first controller 160. The first RNG 130 is capable of providing random numbers to the first controller 160. These random numbers are used by the first controller 160 to enable the first phase modulator 124 to change the phase of received pulses randomly, thereby resulting in pulses where the phase of the pulse is not known, except by Alice 100.

The first PDT 140 is coupled to the first controller 160 and the first WDM 170, and the first optical modem 150 is coupled to the first controller 160 and the first WDM 170. As is illustrated by FIG. 2, the first PDT 140 contains a memory 142 and a processor 144 that are communicatively coupled via a local interface 146. As is described below in more detail below, the first PDT 140, as well as the second PDT 260, is utilized to provide for the transmission of public data (e.g., Ethernet).

The local interface 146 can be, for example but not limited to, one or more buses or other wired or wireless connections, as is known in the art. The local interface 146 may have additional elements, which are omitted for simplicity, such as controllers, buffers (caches), drivers, repeaters, and receivers, to enable communications. Further, the local interface 146 may include address, control, and/or data connections to enable appropriate communications among the aforementioned components.

The processor 144 is a hardware device for executing software, particularly that stored in the memory 142. The processor 144 can be any custom made or commercially available processor, a central processing unit (CPU), an auxiliary processor among several processors associated with the first PDT 140, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 142 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 142 may incorporate electronic, magnetic, optical, and/or other types of storage media. Note that the memory 142 can have a distributed architecture, where various components are situated remote from one another, but can be accessed by the processor 144. It should also be noted that the memory 142 located within the first PDT 140 contains a first in first out (FIFO) buffer. As is known by those having ordinary skill in the art, a FIFO buffer is an area of a memory that holds information in the order in which it was received until the computer has time to use it. Use of the FIFO buffer within the memory 142 is described in detail herein.

Figure 3:
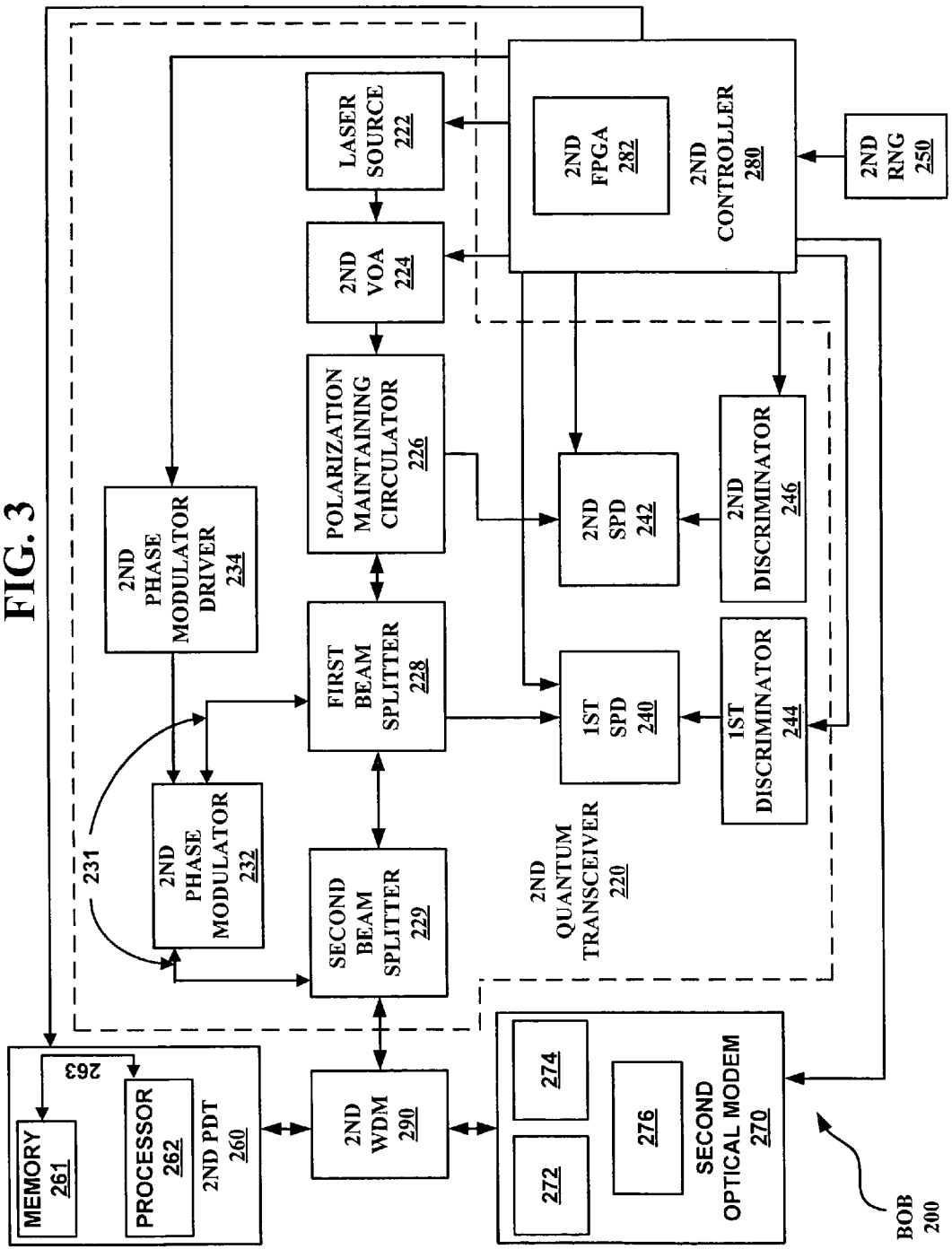
FIG. 3 is a block diagram further illustrating the second QKD station, Bob, of FIG. 1, in accordance with the first exemplary embodiment of the invention.

The first optical modem 150 is capable of transmitting syncs to the second optical modem 270 (FIG. 3). An example of the optical modem is described in detail in the co-pending patent application entitled, "QKD Systems with Robust Timing," having a filing date of Feb. 7, 2004 and having serial number PCT/US2004/003394, which has been incorporated by reference herein in its entirety. Since the creation of syncs is known by those having ordinary skill in the art, further explanation of syncs is not provided herein, except with reference to timing of transmission of such syncs. It should also be noted that portions of the first optical modem 150 are similar to portions of the second optical modem 270. Therefore, reference may be made to the description of the second optical modem 270 herein for additional information regarding the structure and functionality of the first optical modem 150.

FIG. 3 is a block diagram further illustrating the second QKD station, Bob 200, in accordance with the first exemplary embodiment of the invention. Referring to FIG. 3, the second quantum transceiver 220 located in Bob 200 contains a laser source 222. The laser source 222 may be one of many different types of laser sources such as, but not limited to, a 1.5 μm laser that is capable of producing one or more light pulses, where each light pulse has hundreds or thousands of photons and a temporal width of about four hundred (400) picoseconds (ps). Of course, the number of photons in each light pulse, and the temporal width of each light pulse, may vary.

A second VOA 224 is in communication with the laser source 222. The second VOA 224 is used to control the intensity of received light pulses, thereby preferably forming a weaker light pulse than what was received from the laser source 222. It should be noted, however, that the light pulse does need to travel from Bob 200 to Alice 100, and back to Bob 200, therefore, the second VOA 224 is not intended to weaken a received light pulse so much as to prevent returning of the light pulse to Bob 200. Instead, the function of the second VOA 224 is to control the intensity of the light pulse received from the laser source 222 enough so that when the light pulse reaches the first VOA 122, two passes of the light pulse through the first VOA 122 results in formation of a weak pulse having, on average, less than a single photon therein.

The second quantum transceiver 220 also has a polarization maintaining circulator (PMC) 226 located therein, which is coupled to the second VOA 224. The PMC 226 is capable of guiding a received light pulse to a specific destination based upon where the light pulse was received on the PMC 226.

A first beam splitter 228, which is also located within the second quantum transceiver 220, is coupled to the PMC 226. The first beam splitter 228 is preferably a 50/50 beam splitter and is capable of splitting a received light pulse into two pulses. Use of these pulses is described below. Of course, a different category of beam splitter may be substituted.

An optical delay 231, located within the second quantum transceiver 220, is provided between the first beam splitter 228 and a second beam splitter 229, located within the second quantum transceiver 220. The optical delay 231 allows a light pulse received by the optical delay 231 to be delayed by a predetermined amount. In accordance with the first exemplary embodiment of the invention, the optical delay 231 is an extra portion of optical fiber. Specifically, a light pulse may travel from the first beam splitter 228 to the second beam splitter 229, or from the second beam splitter 229 to the first beam splitter 228 via two different paths, where a first path is shorter than the second path. Therefore, the second path provides the optical delay 231. Alternatively, a device, or devices, capable of delaying a light pulse may be utilized instead.

Referring to FIG. 3, the second path contains a second phase modulator 232 therein. A fiber link between the second phase modulator 232 and second beam splitter 229 is arranged so that a second half pulse arrives at a corresponding port of the second beam splitter 229 being orthogonally polarized to a first half pulse, so that the half pulses are sent to a second WDM time-multiplexed and orthogonally polarized 290. Half pulses are described in detail below.

It should be noted that the second beam splitter 229 is preferably a polarization beam splitter. The second beam splitter 229 is preferably a polarization beam splitter so as to provide the capability of sending orthogonally polarized pulses to the second WDM 290 and to separately route light pulses based on polarization of the light pulses.

A second phase modulator 232, located within the second quantum transceiver 220, which is capable of randomly modulating phase of a pulse that traverses the optical delay 231, is coupled to both the first beam splitter 228 and the second beam splitter 229. The random modulation of phase is due to a second random number generator 250 that is connected to the second controller 280, both of which are located outside of the second quantum transceiver 220.

A second phase modulator driver 234 is coupled to the second phase modulator 232 for driving the second phase modulator 232 in accordance with commands received by the second phase modulator driver 234, from the second controller 280. The second phase modulator driver 234 is located within the second quantum transceiver 220.

The second quantum transceiver 220 located in Bob 200 also contains a first single-photon detector (SPD) 240 coupled to the first beam splitter 228 and the second controller 280, and a second SPD 242 coupled to the PMC 226 and the second controller 280. The first SPD 240 and the second SPD 242 are in communication with a first discriminator 244 and a second discriminator 246, respectively, which are capable of driving the first SPD 240 and the second SPD 242, respectively.

The second QKD station, Bob 200, also contains the second controller 280, the second RNG 250, the second optical modem 270, the second WDM 290, and the second PDT 260. The second PDT 260 contains logic similar to the logic located within the first PDT 140, namely a memory 261, a processor 262, and a local interface 263. The second PDT 260 is coupled to the second WDM 290, while the second WDM 290 is coupled to the second PDT 260, the second beam splitter 229, and the second optical modem 270. In addition the second WDM 290 is connected to the single optical fiber 112 connecting the first QKD station, Alice 100, and the second QKD station, Bob 200.

The second controller 280 is coupled to the laser source 222, the first and second SPDs 240, 242, the second VOA 224, the second RNG 250, the second PM modulator driver 234, the first and second discriminators 244, 246, the second optical modem 270, and the second PDT 260. In addition, the second controller 280 has a second FPGA 282 therein. The second controller 280 and second FPGA 282, and use thereof, is described in detail hereafter, with reference to the description of FIG. 4, FIG. 5, and FIG. 6.

The second optical modem 270 also contains a timing/synch laser (i.e., an optical transmitter) 272 (e.g., operating at 1.3 µm) and a timing/synch detector (i.e., an optical receiver) 274, both of which are coupled to a circulator 276. The timing/synch laser 272 and timing/synch detector 274 are coupled to the second controller 280. As has been mentioned above, an example of an optical modem is described in detail in the currently pending patent application entitled, "QKD Systems with Robust Timing," having a filing date of Feb. 7, 2004, and having serial number PCT/US2004/003394, which has been incorporated by reference herein in its entirety. Basically, optical timing signals (syncs) are processed by the optical modems 150, 270, which convert the sync into corresponding electrical timing signals, and vice versa.

Generally, logical devices within the QKD system 10 function as follows in the transmission of quantum signals. The laser source 222 transmits a light pulse, where the light pulse has hundreds or thousands of photons and a temporal width of about four hundred (400) picoseconds (ps). Of course, the number of photons in the light pulse, and the temporal width of the light pulse, may vary.

The light pulse is received by the second VOA 224. The second VOA 224 is used to control the intensity of the received light pulse, thereby forming a weaker light pulse than what was received from the laser source 222. It should be noted, however, that the light pulse does need to travel from Bob 200 to Alice 100, and back to Bob 200, therefore, the second VOA 224 is not intended to weaken the received light pulse so much as to prevent returning of the light pulse to Bob 200. Instead, the function of the second VOA 224 is to control the intensity of the light pulse received from the laser source 222 enough so that when the light pulse reaches the first VOA 122, two passes of the light pulse through the first VOA 122 results in formation of a weak pulse having, on average, less than a single photon therein.

The present system uses two VOAs having average maximum attenuations, each of which gradually decreases intensity of a received light pulse each time the light pulse traverses one of the VOAs, resulting in formation of a weak pulse having, on average, less than a single photon therein. Alternatively, a single VOA may be used within Alice 100 for controlling the intensity of a received light pulse, thereby preferably forming a weak pulse having, on average, less than a single photon therein. As an example, there may be an average of approximately 0.1 photons or less per pulse transmitted by the single VOA located within Alice 100.

The weakened light pulse is received by the polarization maintaining circulator 226 and guided to the first beam splitter 228. The first beam splitter 228, which is preferably a 50/50 beam splitter, separates the light pulse into a first half light pulse and a second half light pulse. The first half light pulse is transmitted directly to the second beam splitter 229, while the second half light pulse is transmitted indirectly to the second beam splitter 229, via the optical delay 231 and the second phase modulator 232. The optical delay 231 causes the second half light pulse to lag behind the first half light pulse by a predetermined time. As an example, the second half light pulse may traverse the QKD system 10 after the optical delay 231 by 20 ns. It should be noted that on the path from Bob 200 to Alice 100, the second phase modulator 232 does not change phase of the second half light pulse, as instructed by the second controller 280.

Both the first half light pulse and the second half light pulse are received by the second beam splitter 229, although the second half light pulse arrives at the second beam splitter 229 after the first half light pulse. The fiber link between second phase modulator 232 and second beam splitter 229 is arranged so that the second half pulse arrives at the corresponding port of the second beam splitter 229 being orthogonally polarized to the first half pulse, so they are sent to the second WDM 290 time-multiplexed and orthogonally polarized. As mentioned above, the second beam splitter 229 is preferably a polarization beam splitter. The second beam splitter 229 forwards the orthogonally polarized first half light pulse and second half light pulse to the second WDM 290.

Both the first half light pulse and the second half light pulse are then received by the second WDM 290, which combines the separate wavelengths from the second quantum transceiver 220, the second optical modem 270, and the second PDT 260 into the single optical fiber 112 having multiple channels. As is described herein with regard to the detailed description of FIG. 4, FIG. 5, and FIG. 6, the quantum signals (i.e., the first half light pulse and the second half light pulse), the syncs, and the public data are time multiplexed by the QKD system 10 so that quantum signals and syncs are allowed to be transmitted between Bob 200 and Alice 100 concurrently, and public data is not transmitted while quantum signals and/or syncs are transmitted.

The second WDM 290 transmits the first half light pulse and the second half light pulse to the first WDM 170. When the first half light pulse is received by the first WDM 170, the first half light pulse is transmitted to the first VOA 122. In addition, after the predetermined delay, the second half light pulse is received by the first WDM 170 and forwarded to the first VOA 122. The first VOA 122 controls intensity of the first half light pulse and the second half light pulse so as to decrease intensity of the pulses. The first half light pulse is then transmitted from the first VOA 122 to the first phase modulator 124. The first controller 160 controls the first phase modulator 124 so that the phase of the first half light pulse is randomly modulated. In addition, the first controller 160 prevents the first phase modulator 124 from modulating phase of the second half light pulse.

After being phase modulated, the first half light pulse is reflected and rotated in polarization by ninety degrees by the Faraday mirror 126. Phase of the first half light pulse is again randomly modulated by the first phase modulator 124 after which the first half light pulse is transmitted to the first VOA 122.

Alternatively, when the second half light pulse is received by the first phase modulator 124, the first controller 160 prevents the first phase modulator 124 from modulating the phase of the second half light pulse. The second half light pulse is then transmitted to the Faraday mirror 126 where the second half light pulse is reflected and rotated in polarization by ninety degrees by the Faraday mirror 126. The second half light pulse is also transmitted from the first phase modulator 124 to the first VOA 122.

The first VOA 122 controls intensity of the first half light pulse and controls intensity of the second half light pulse so as to form two weak pulses. Each formed weak pulse has on average, less than a single photon therein. As an example, there may be an average of approximately 0.1 photons or less per pulse after intensity of the pulse is controlled by the first VOA 122. The first half light pulse and the second half light pulse are received by the first WDM 170 and transmitted to the second WDM 290 in a manner similar to that taken to transmit the first half light pulse and the second half light pulse from the second WDM 290 to the first WDM 170.

Upon receipt of the first half light pulse, the second WDM 290 transmits the first half light pulse to the second beam splitter 229. As mentioned above, the second beam splitter 229 is preferably a polarization beam splitter that directs received light pulses to either the optical delay 231 or directly to the first beam splitter 228 based on polarity of the light pulse.

Due to polarization of the first half light pulse, the second beam splitter 229 transmits the received first half light pulse to the optical delay 231, and through the second phase modulator 232. The second controller 280 controls the second phase modulator 234 so that the phase of the first half light pulse is randomly modulated. In addition, the optical delay 231 delays the first half pulse so that the first half light pulse and the second half light pulse meet at the first beam splitter 228.

Upon receipt of the second half light pulse, the second WDM 290 transmits the second half light pulse to the second beam splitter 229. Due to polarization of the second half light pulse, the second beam splitter 229 transmits the received second half light pulse directly to the first beam splitter 228. Based on results of interference created by the first half pulse and the second half pulse at the first beam splitter 228, the resulting interference pulse goes either to first SPD 240 or to the polarization maintaining circulator 226. The polarization maintaining circulator 226 directs a light pulse received from the first beam splitter 228 to the second SPD 242.

The first and second SPDs 240, 242 are utilized for the analysis of quantum signals, as is common in quantum key distribution Operation of the QKD System As has been mentioned above, the QKD system 10 enables quantum key distribution and the transmission of public discussion layer data (e.g., Ethernet) over the single optical fiber 112 or other transmission medium, where the single optical fiber 112 is relatively long in length. This is provided by reducing or removing power made available to allow public discussion layer data transmission whenever quantum signals and/or synchronization signals (synchs) are to be transmitted and received. This process is described in detail below with regard to the general operation of the QKD system 10.

Functionality associated with determining when to transmit quantum signals, public data (e.g., Ethernet), and/or timing signals is defined within the first and second controllers 160, 280. Specifically, the first and second controllers 160, 280 contain logic therein that perform steps necessary to determine a transmission sequence. The steps performed by this logic, otherwise referred to as time multiplexing, are described below with regard to FIG. 4, FIG. 5, and FIG. 6. It should be noted that, in accordance with the first exemplary embodiment of the invention, the second controller 280 contains logic therein that performs steps necessary to determine a transmission sequence. The first controller 160 acts in response to the second controller 280. As an example, the first controller 160 may either use a special sync signal or measure incoming power level drop to near zero. Of course, instead, the first controller 160 may contain logic therein that performs the steps necessary to determine transmission sequence, while the second controller 280 acts in response to the first controller 160.

It should be noted that, while functionality associated with the determination of a transmission sequence is described herein as being performed by hardware, and specifically, by an FPGA, in an alternative embodiment, this functionality may be performed by software, firmware, or a combination of software, firmware, and hardware. As an example, if the functionality were performed in software or firmware, the software or firmware would be stored in a memory that is executed by a suitable instruction execution system.

Figure 4:
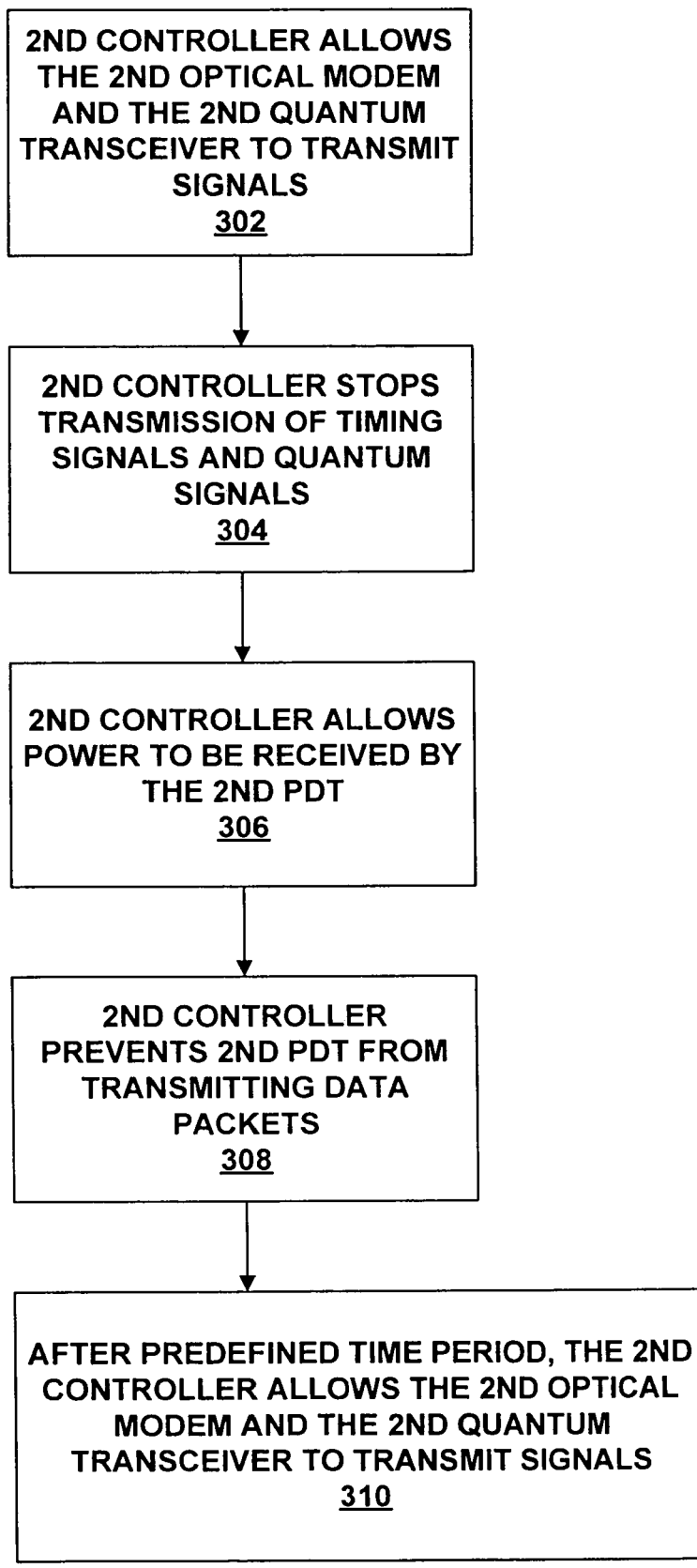
FIG. 4 is a flow chart showing the architecture, functionality, and operation of a possible implementation of the QKD system of FIG. 1 for timing of transmitting quantum signals, synchronization signals, and public data.

FIG. 4 is a flow chart 300 showing the architecture, functionality, and operation of a possible implementation of the QKD system 10 for timing of transmitting quantum signals, synchronization signals, and public data. In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified herein below. The following description is with regard to FIG. 4 and FIG. 3.

For exemplary purposes, the following description assumes that the QKD system 10 begins by allowing Bob 200 to transmit quantum signals and timing signals. It should be noted, however, that the QKD system 10 may instead begin by allowing Bob 200 to transmit public data (i.e., Ethernet). As is described in detail below, the second controller 280 allows the transmission of packets of data, quantum signals, and synchronization signals in accordance with a predefined transmission schedule. The transmission schedule may be stored within the second controller 280 or at a location external to the second controller 280. Specifically, the transmission schedule allows the transmission of quantum signals and timing signals at the same time, while ensuring that transmission of quantum signals and timing signals is performed at a time different from a time set for the transmission of public data (e.g., Ethernet).

As is shown by block 302, the second controller 280, via the second FPGA 282, allows the second optical modem 270 and the second quantum transceiver 220 to transmit timing signals and quantum signals, respectively, to Alice 100. Specifically, the second FPGA 282 allows power from either the second controller 280 or an external power source (not shown) to be received by both the second optical modem 270 and the second quantum transceiver 220. The second FPGA 282 may allow power to be received by using switching technology known by those having ordinary skill in the art to be associated with an FPGA. When both the second optical modem 270 and the second quantum transceiver 220 are allowed to transmit associated signals, they are allowed to transmit such signals simultaneously within their respective channels.

As is shown by block 304, in accordance with a predefined schedule allocating specific timing slots for the transmission of either, timing signals and quantum signals, or public data (e.g., Ethernet), the second controller 280, via the second FPGA 282, stops the transmission of timing signals and quantum signals. Specifically, the second controller 280, via the second FPGA 282, prevents power, from either the second controller 280 or an external power source (not shown), from being received by both the second optical modem 270 and the second quantum transceiver 220. It should be noted that, in accordance with an alternative embodiment of the invention, the transmission of timing signals and quantum signals may continue, however, if transmission of such signals continues, the first quantum transceiver 120 deletes such signals or simply does not utilize such signals.

As is mentioned above, timing slots for the transmission of timing signals, quantum signals, and public data is predefined, as is action to be performed during each timing slot. Specifically, the second controller 280 has stored therein a schedule for the transmission of signals and public data.

It should be noted that timing slots are time intervals provided for exclusive receiver activity allocated on a rotating basis. The highest power signal, public data (e.g., Ethernet), is allocated a fixed length according to system bandwidth needs. The next timing slot, flush, is when the public data (e.g., Ethernet) signal is not transmitted, and the scattering in the optical fiber decreases as the high-powered signal (i.e., public data signal) travels through the optical fiber. The third timing slot is when the scattering is at its low level, and single photon reception can occur without excessive error. This timing slot consumes most of the time the QKD system 10 is on.

The timing slot length for the flush is determined by fiber length. Timing slot length ratio for public data (e.g., Ethernet) vs. quantum bits is calculated based on expected error and rate and messaging required. Total round time should be long to reduce effect of no data transfer during the flush timing slot, however, too long a flush increases public data latency. Round time is set by the maximum latency tolerable to higher-level algorithms.

As is shown by block 306, in accordance with the predefined schedule allocating timing slots, the second controller 280, via the second FPGA 282, allows power from either the second controller 280 or an external power source (not shown) to be received by the second PDT 260. Specifically, the second FPGA 282, via known internal switching technology, allows power to be received by the second PDT 260. With power being received by the second PDT 260, public data is allowed to be transmitted from Bob 200 to Alice 100.

It should be noted, that in accordance with an alternative embodiment of the invention, quantum signals and timing signals may continue to be transmitted during the transmission of public data, however, the quantum signals and timing signals received during receipt of public data will not be utilized by the QKD system 10.

As is shown by block 308, in accordance with the predefined schedule for allocating timing slots, after a predefined time period, the second controller 280, via the second FPGA 282, prevents the second PDT 260 from transmitting data packets. As an example, the second controller 280 may prevent power from being received by the second PDT 260. It should be noted that the second controller 280 preferably does not wait until the end of transmitting of a public data packet by Bob 200 prior to stopping power from being received by the second PDT 260. Instead, in accordance with the predefined schedule, power is prevented from being received by the second PDT 260 in accordance with when the predefined schedule instructs the second controller 280 to prevent power from being received by the second PDT 260. Immediately preventing power from being received by the second PDT 260 results in the data being transmitted by the second PDT 260 no longer being capable of transmission. Therefore, the memory 262 located within the second PDT 260 is capable of storing data to be transmitted until the second controller 280 again allows power to be received by the second PDT 260. This is why a FIFO memory is best utilized within the second PDT 260. With use of the FIFO memory, data packets to be transmitted by the second PDT 260 will be stored in their original order until power is once again received by the second PDT 260, after which the stored data will be transmitted in the order first received.

As is shown by block 310, the second controller 280, via the second FPGA 282, then allows the second optical modem 270 and the second quantum transceiver 220 to transmit timing signals and quantum signals, respectively, to Alice 100. It should be noted, however, that the second controller 280 preferably does not allow the second optical modem 270 and the second quantum transceiver 220 to transmit timing signals and quantum signals, respectively, to Alice 100 until after a predefined period of time after power has been prevented from reaching the second PDT 260. This predefined period of time is preferably based upon the length of the optical fiber 112. Specifically, the length of the optical fiber 112 determines how long it will take for a public data packet to travel from Bob 200 to Alice 100. Therefore, the predetermined period of time is based upon how long it will take for a data packet to travel from Bob 200 to Alice 100, or, in other words, the length of the optical fiber 112.

It should be noted that, instead of controlling power allocation, the second FPGA 282 may control a driver associated with the second optical modem 270, a driver associated with the second quantum transceiver 220, and a driver associated with the second PDT 260. By turning such drivers on and off, the second FPGA 282 can control the time of transmission of synchs, quantum signals, and data packets.

Figure 5:
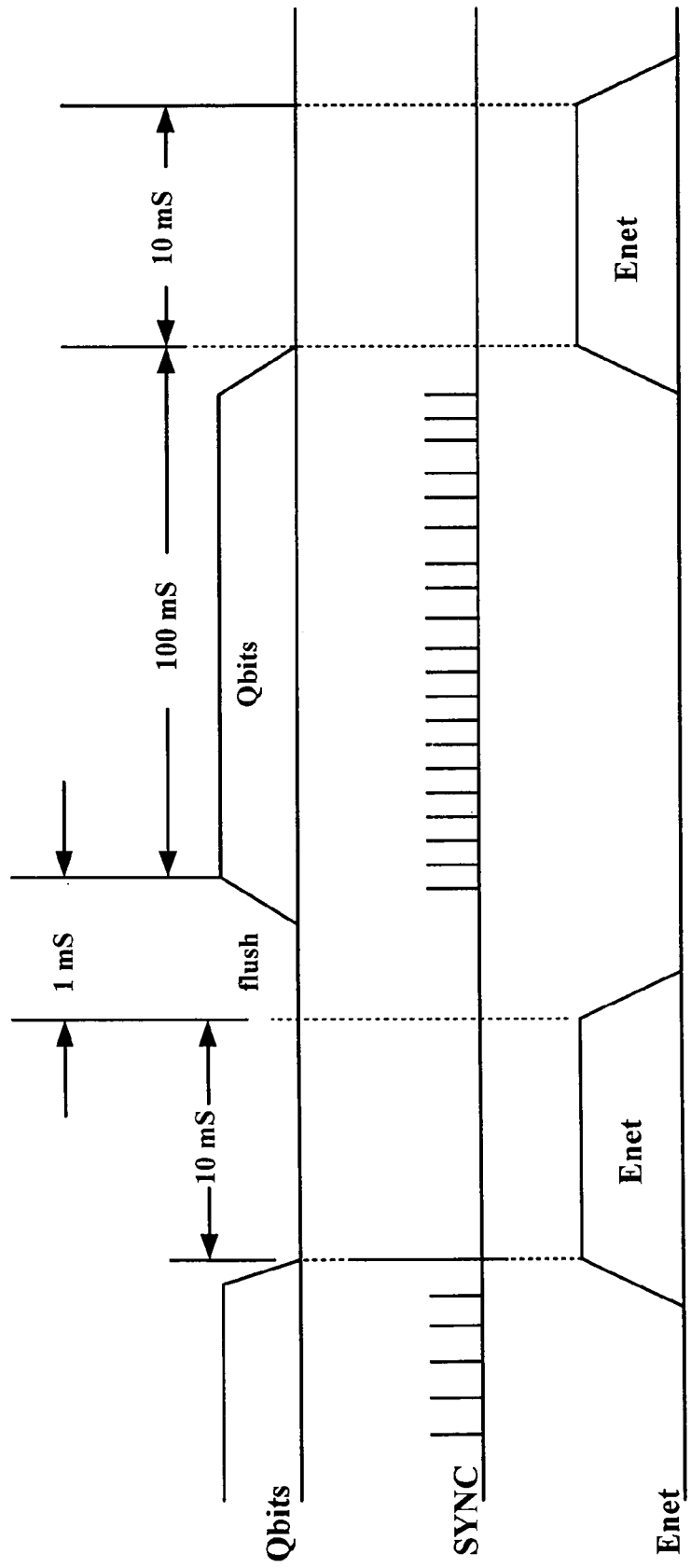
FIG. 5 is a schematic diagram illustrating an example of predefined timing slots and the transmission of quantum signals, synchronization signals, and public data by the QKD system of FIG. 1.
Figure 6:
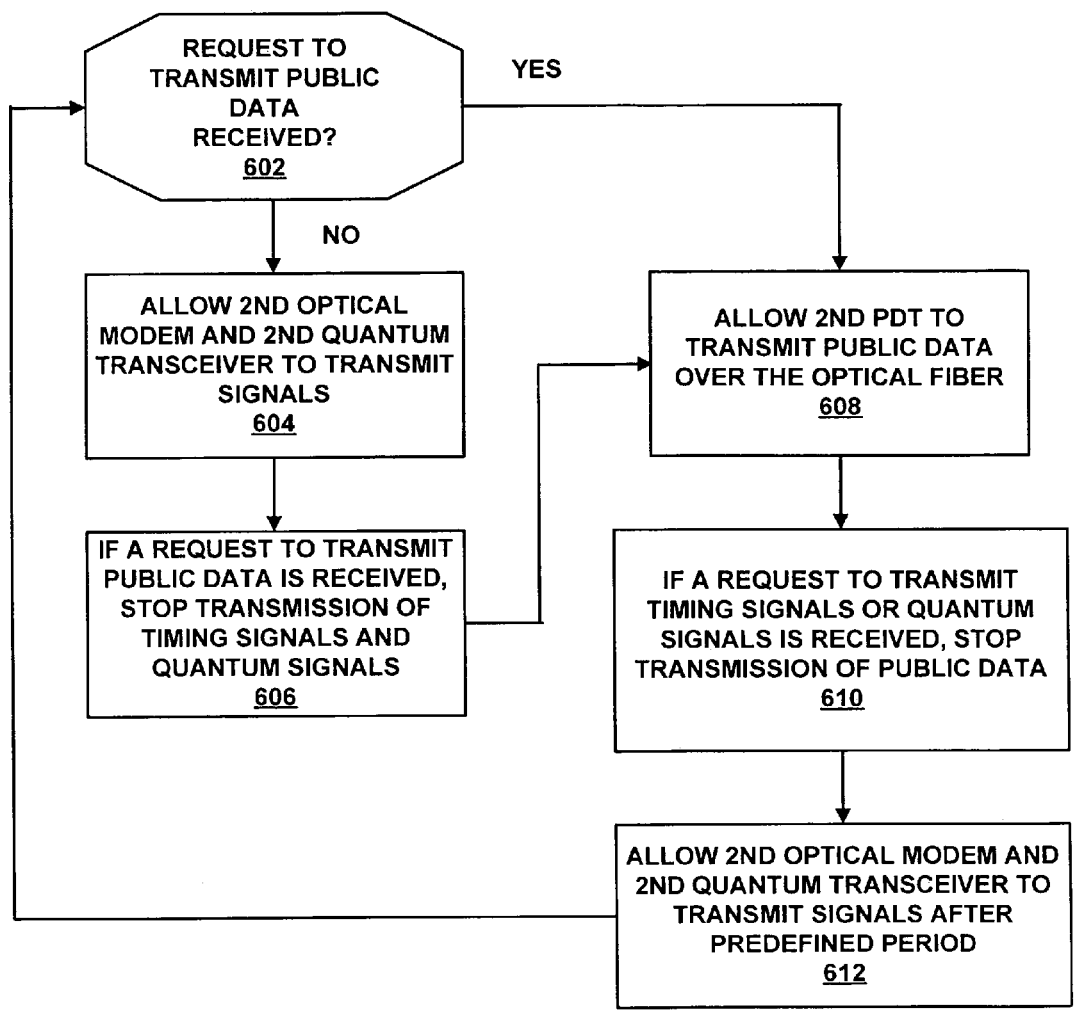
FIG. 6 is a flow chart showing the architecture, functionality, and operation of a possible implementation of the QKD system of FIG. 1 for timing of transmitting quantum signals, synchronization signals, and public data, in accordance with a second exemplary embodiment of the invention.

As has been described herein, the QKD system 10 provides for the transmission of quantum signals and timing signals at the same time (i.e., during the same timing slots), while public data is transmitted at a different time (i.e., during different timing slots). FIG. 5 is a schematic diagram illustrating an example of predefined timing slots and the transmission of quantum signals (e.g., Qbits), synchronization signals (sync), and public data (e.g., Ethernet (Enet)). In accordance with the example illustrated by FIG. 5, 100 ms are allocated for the transmission of quantum signals and synchronization signals. In addition 10 ms are allocated for the transmission of public data.

As has been described herein-above, after power has been prevented from reaching the second PDT 260, a predefined period of time is allowed to pass prior to the second controller 280 allowing the second quantum transceiver 220 and the second optical modem 270 to transmit quantum signals and synchronization signals, respectively. In the example illustrated by FIG. 5, this predefined period is referred to as a "flush" and the "flush" is approximately 1 ms long.

It should be noted that the example of predefined timing slots illustrated by FIG. 5 is merely an example. This example is not intended to signify how long different signals are allowed to be transmitted. Instead, FIG. 5 is provided to illustrate that quantum signals and synchronization signals are transmitted at a time different from when public data is transmitted.

In accordance with an alternative embodiment of the invention, the QKD system 10 may instead function in accordance with requests for data or signal transmission. The following provides an example of such a QKD system 10, the functions of which are illustrated by the flow chart of FIG. 6.

As is shown by block 602, the second controller 280 determines if a request to transmit public data has been received from the second PDT 260. If a request to transmit public data has not been received, the second controller 280 allows the second optical modem 270 and the second quantum transceiver 220 to transmit timing signals and quantum signals, respectively, in a manner described herein (block 604).

If during transmission of timing signals and quantum signals, a request to transmit public data is received by the second PDT 260, the second optical modem 270 and the second quantum transceiver 220 are controlled by the second controller 280 so as to stop the transmission of timing signals and quantum signals (block 606). As an example, power to a driver (not shown) of the second quantum transceiver 220 and a driver (not shown) of the second optical modem 270 may be stopped, thereby preventing the second quantum transceiver 220 and the second optical modem 270 from transmitting their respective signals.

As is shown by block 608, after stopping transmission of quantum signals and timing signals (block 606), the second PDT 260 is allowed to transmit public data over the single optical fiber 112. If a request is received by the second controller 280, from either the second optical modem 270 or the second quantum transceiver 220, for transmission of associated signals, the second PDT 260 is no longer allowed to transmit public data (block 610).

As is shown by block 612, the second controller 280, via the second FPGA 282, then allows the second optical modem 270 and the second quantum transceiver 220 to transmit timing signals and quantum signals, respectively, to Alice 100. It should be noted, however, that the second controller 280 preferably does not allow the second optical modem 270 and the second quantum transceiver 220 to transmit timing signals and quantum signals, respectively, to Alice 100 until after the predefined period of time after power has been prevented from reaching the second PDT 260.

Specifically, timing logic within the second controller 280 may have stored therein the amount of time required for a public data packet to be entirely transmitted from the second PDT 260, across the optical fiber 112, to the first PDT 140. Therefore, the second FPGA 282 is capable of preventing the second optical modem 270 and the second quantum transceiver 220 from transmitting respective signals until public data has been completely received by the first PDT 140.

It should be noted that if data packets are requested to be transmitted from the second PDT 260 to the first PDT 140 while timing signals and quantum signals are being transmitted, the data packets are stored within the memory 262 of the second PDT 260 until the second controller 280 allows such transmission.

It should be noted that one having ordinary skill in the art would appreciate that, while the present disclosure describes a two-way QKD system, similar technology may be utilized to provide a one-way QKD system. One having ordinary skill in the art would understand how to provide such a one-way QKD system. As an example, at Alice 100 (FIG. 2) replace the Faraday mirror 126 with a laser source, at Bob 200 (FIG. 3) omit the polarization beam splitter and replace it with 2×2 fiber couplers or 50×50 bulk optics beam splitters, as well as removing the circulator 226. In addition, corresponding changes would be made to controlling hardware and software.

It should be emphasized that the above-described embodiments of the present invention are merely possible examples of implementations merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for providing quantum key distribution, comprising:
    a first public data transceiver configured to transmit public data in accordance with a predefined timing sequence;
    a first optical modulator/demodulator configured to transmit timing signals in accordance with said predefined timing sequence;
    a first quantum transceiver configured to transmit quantum signals in accordance with said predefined timing sequence;
    a first controller operably connected to said first public data transceiver, said first optical modulator/demodulator, and said first quantum transceiver, said first controller being configured to control the transmission of said public data, said timing signals, and said quantum signals in accordance with said predefined timing sequence; and
    wherein said predefined timing sequence further comprises:
    a) a first predefined timing slot in which public data, quantum signals and timing signals are transmitted and wherein the quantum and timing signals so transmitted are ultimately discarded;
    b) a flush period in which no public data is transmitted; and
    c) a second predefined timing slot in which only quantum signals and timing signals are transmitted.

2. The system of claim 1, wherein said first quantum transceiver further comprises:
    a light source controlled by said first controller;
    a modulator optically coupled to the light source; and
    a modulator driver operably coupled to and controlled by said first controller, wherein said first controller controls modulation of quantum signals by said modulator.

3. The system of claim 1, further comprising:
    a first random number generator (RNG) that is connected to the first controller, said first RNG providing random numbers to the first controller so as to cause the first quantum transceiver to randomly impart a phase to the quantum signals.

4. The system of claim 1, further comprising a single optical fiber link, where said transmitting of quantum signals, public data, and timing signals, is performed over said single optical fiber link.

5. The system of claim 1, wherein said first public data transceiver is also configured to receive public data in accordance with said predefined timing sequence, said first optical modulator/demodulator is also configured to receive timing signals in accordance with said predefined timing sequence, and said first quantum transceiver is also configured to receive quantum signals in accordance with said predefined timing sequence.

6. The system of claim 5, further comprising:
    a second public data transceiver configured to receive said transmitted public data signals in accordance with said predefined timing sequence;
    a second optical modulator/demodulator configured to receive said transmitted timing signals in accordance with said predefined timing sequence;
    a second quantum transceiver configured to receive quantum signals in accordance with said predefined timing sequence; and
    a second controller operably connected to said second public data transceiver, said second optical modulator/demodulator, and said second quantum transceiver.

7. A system for providing quantum key distribution, comprising:
    means for transmitting public data in accordance with a predefined timing sequence;
    means for transmitting timing signals in accordance with said predefined timing sequence;
    means for transmitting quantum signals in accordance with said predefined timing sequence;
    means for controlling transmission of said public data, said timing signals, and said quantum signals in accordance with said predefined timing sequence; and
    wherein said predefined timing sequence comprises:
    a) a first predefined timing slot in which public data, quantum signals and timing signals are transmitted and wherein the quantum and timing signals so transmitted are ultimately discarded;
    b) a flush period in which no public data is transmitted; and
    c) a second predefined timing slot in which only quantum signals and timing signals are transmitted.

8. The system of claim 7, wherein said means for transmitting public data is also configured to receive public data in accordance with said predefined timing sequence, said means for transmitting timing signals configured to receive timing signals in accordance with said predefined timing sequence, and said means for transmitting quantum signals being configured to receive quantum signals in accordance with said predefined timing sequence.

9. The system of claim 8, further comprising:
    means for receiving said transmitted public data signals in accordance with said predefined timing sequence;
    means for receiving said transmitted timing signals in accordance with said predefined timing sequence;
    means for receiving said transmitted quantum signals in accordance with said predefined timing sequence; and
    means for controlling said means for receiving said transmitted public data, said means for receiving said transmitted timing signals, and said means for receiving said transmitted quantum signals.

10. A method of providing quantum key distribution, public data distribution, and timing signal distribution over a single medium in accordance with a predefined timing sequence, comprising the steps of:
    transmitting public data signals during a first predefined timing slot;
    stopping the transmission of said public data for a predefined period; and
    transmitting quantum signals and timing signals during a second predefined timing slot, wherein said first and second predefined timing slots define said predefined timing sequence; and wherein said first predefined timing slot and said second predefined timing slot overlap so that the quantum signals, the timing signals and the public data signals are sent during the overlapped timing slots, and including transmitting only said quantum signals and said timing signals during a third predefined timing slot and disregarding those quantum signals and timing signals transmitted during said first and second overlapping timing slots.

11. The method of claim 10, wherein said step of transmitting quantum signals further comprises the steps of:

producing a light pulse;

separating said light pulse into a first half pulse and a second half pulse;

transmitting said first half pulse;

delaying transmission of said second half pulse; and transmitting said second half pulse.

12. The method of claim 10, wherein said step of transmitting quantum signals further comprises the step of randomly changing phase of pulses.

13. The method of claim 10, wherein said step of stopping the transmission of said public data for a predefined period further comprises the step of preventing the receipt of power by a source of said public data.

* * * * *